US009047993B2

(12) United States Patent
Heit et al.

(10) Patent No.: US 9,047,993 B2
(45) Date of Patent: Jun. 2, 2015

(54) METHOD AND ARRANGEMENT FOR PRODUCING FUEL KERNELS

(75) Inventors: Werner Heit, Grossenhausen (DE); Martin Kadner, Maintal (DE); Georg Braehler, Freigericht (DE); Karl Froschauer, Freigericht (DE)

(73) Assignee: NUKEN TECHNOLOGIES GMBH, Alzenau (DE)

( * ) Notice: Subject to any disclaimer, the term of this patent is extended or adjusted under 35 U.S.C. 154(b) by 616 days.

(21) Appl. No.: 13/130,199

(22) PCT Filed: Nov. 23, 2009

(86) PCT No.: PCT/EP2009/065666
§ 371 (c)(1),
(2), (4) Date: Jul. 27, 2011

(87) PCT Pub. No.: WO2010/063603
PCT Pub. Date: Jun. 10, 2010

(65) Prior Publication Data
US 2011/0285040 A1 Nov. 24, 2011

(30) Foreign Application Priority Data
Dec. 1, 2008 (DE) .......................... 10 2008 055 468

(51) Int. Cl.
B29C 44/34 (2006.01)
G21C 3/62 (2006.01)
G21C 3/42 (2006.01)
(Continued)

(52) U.S. Cl.
CPC .. *G21C 3/62* (2013.01); *G21C 3/42* (2013.01); *G21C 3/58* (2013.01); *G21C 3/623* (2013.01); *G21C 21/02* (2013.01); *Y02E 30/38* (2013.01)

(58) Field of Classification Search
USPC ............ 264/50, 621, 15, 46.9, 574, 0.5, 233, 264/661, 3.4, 3.5, 3.6, 7–14, 108, 115, 117, 264/121, 140
See application file for complete search history.

(56) References Cited

U.S. PATENT DOCUMENTS 3,812,049 A 5/1974 Noothout et al.
3,831,857 A * 8/1974 Scott .............................. 239/424
(Continued)

FOREIGN PATENT DOCUMENTS

DE 1817092 7/1970
JP 6191851 7/1994
JP 2007197242 A 8/2007

OTHER PUBLICATIONS

Japanese Office Action mailed Mar. 18, corresponding to Japanese Patent Application 2011-538944; with English translation.

*Primary Examiner* — Stella Yi
(74) *Attorney, Agent, or Firm* — Ladas & Parry LLP

(57) ABSTRACT

A method and an arrangement for producing spherical fuel cores and/or breeder material cores by dripping a pouring solution containing uranyl nitrate and a solution containing at least one auxiliary agent into an ammoniacal precipitation bath to form microspheres, aging, washing, drying, and thermally treating the microspheres. In order to provide a continuous production method along with a constantly high core quality, it is proposed that 1) the microspheres from the precipitation bath be separated through a first separator and fed to the ammoniacal aging water for aging, 2) the contact duration of the microspheres with the liquid of the precipitation bath before being introduced into the aging water be set equally or substantially equally, 3) the microspheres be transferred from the aging water to a multi-stage cascade scrubber using a transfer device, wherein the microspheres are washed in the multi-stage cascade scrubber so as to be free or substantially free from ammonium nitrate and at least one auxiliary agent contained in the microspheres, and 4) after drying, the microspheres be calcinated while distributed in a monolayer during a thermal treatment.

30 Claims, 9 Drawing Sheets

Figure 2:
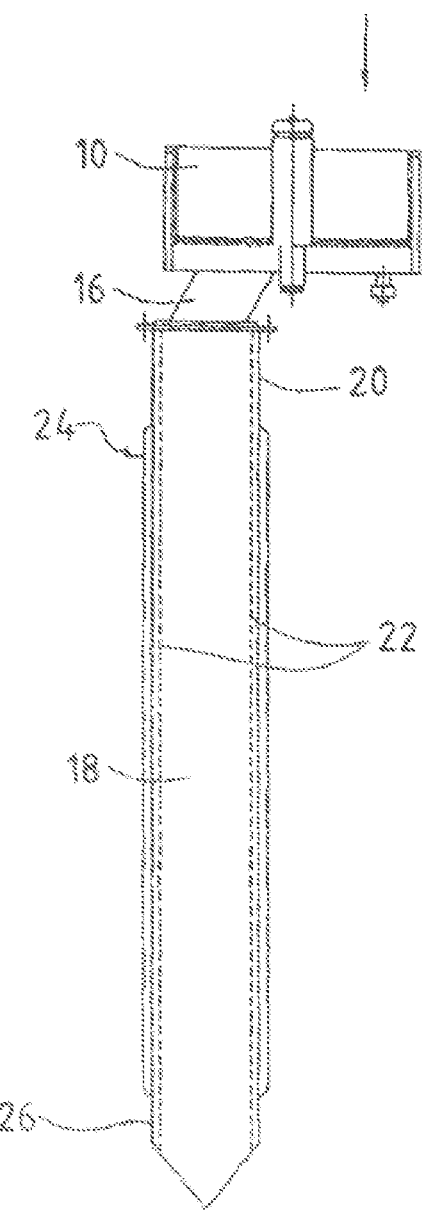

(51) Int. Cl.
*G21C 3/58* (2006.01)
*G21C 21/02* (2006.01)

(56) References Cited

U.S. PATENT DOCUMENTS

| | | | | |
|---|---|---|---|---|
| 4,038,202 A | * | 7/1977 | Votocek | 252/635 |
| 4,062,697 A | | 12/1977 | Egli et al. | |
| 4,367,184 A | * | 1/1983 | Stinton | 264/0.5 |
| 4,663,093 A | * | 5/1987 | Haas et al. | 264/0.5 |
| 5,081,102 A | * | 1/1992 | Gay et al. | 505/510 |
| 2008/0035056 A1 | | 2/2008 | Okubo et al. | |
| 2010/0133143 A1 | * | 6/2010 | Roes et al. | 208/23 |
| 2010/0283005 A1 | * | 11/2010 | Pickett et al. | 252/301.6 S |

* cited by examiner

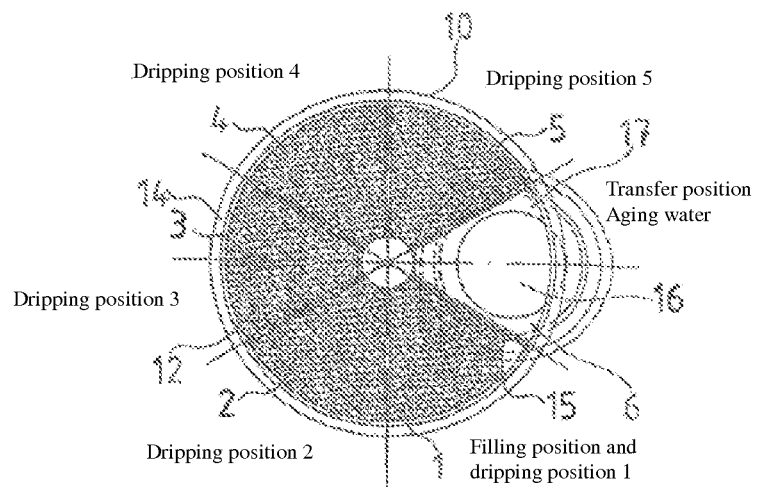
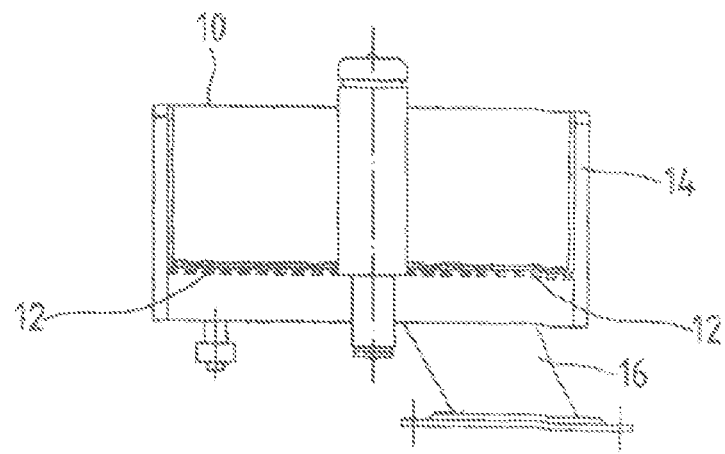
Fig.1

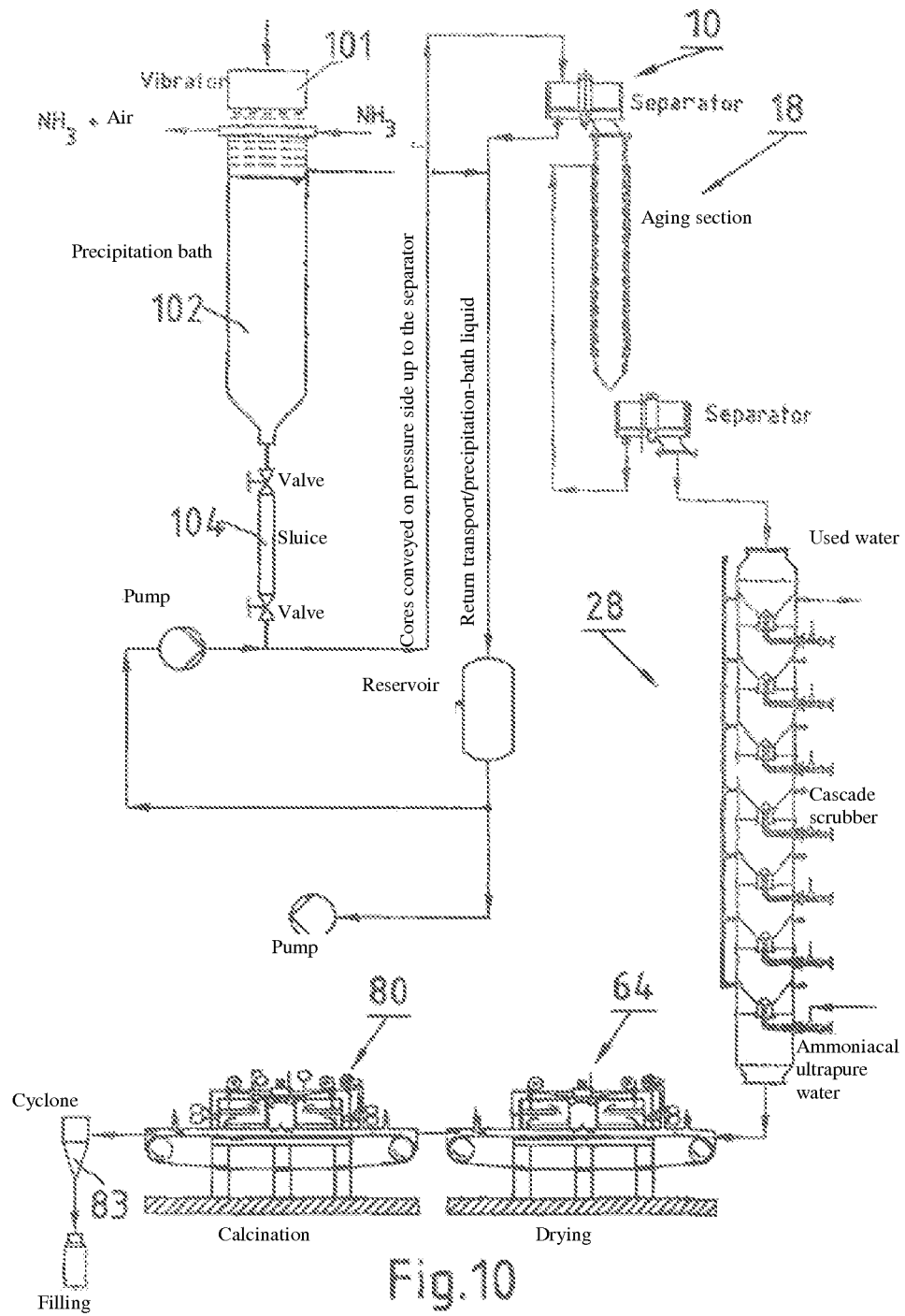

METHOD AND ARRANGEMENT FOR PRODUCING FUEL KERNELS

The invention relates to a method for producing spherical fuel kernels and/or breeder material kernels having a size preferably in the range between 300 μm and 800 μm, particularly for producing kernels made of uranium oxide and/or uranium carbide and/or a uranium containing mixed oxide and/or mixed carbide by dripping a pouring solution containing uranyl nitrate into an ammoniacal precipitation bath for the formation of microspheres, aging and washing of microspheres so produced in an ammonia solution, drying as well as a thermal treatment. The invention relates, furthermore, to an arrangement for producing spherical fuel and/or breeder material pellets, comprising a precipitation bath, an aging section, a washing installation, and a thermal treatment installation for drying and calcination as well as transfer devices for microspheres produced during the manufacture, and kernels produced from them.

In the gel precipitation process referred to as external gelation, insoluble ammonium diuranate (ADU) forms, as well as water-soluble ammonium nitrate as byproduct. Additional additives to the pouring solution, such as, tetrahydrofurfuryl alcohol (THFA) and optionally urea must also be washed out of the ADU gel microspheres by washing with ammonia water.

The following publications are mentioned as state of the art; they relate to drop formation in air, preliminary solidification of the drops in ammonia gas, and the collection of the microspheres in the ammoniacal precipitation bath: DE-B-20 37 232, DE-B-1 817 092, DE-B-24 59 445, DE-B-26 01 684, DE-B-29 22 686, and DE-A-27 14 873.

In the citation NUCLEAR TECHNOLOGY, Vol. 42 (February 1979), pp. 163-171 "Preparation of Uranium Kernels by an External Gelation Process," the EGU (External Gelation of Uranium) process of the Jülich Nuclear Research Installation for producing uranium oxide or uranium carbide kernels having a diameter up to 0.3 mm from reprocessed uranium 233 in hot cells is summarized.

The citation Journal of NUCLEAR SCIENCE and TECHNOLOGY, Vol. 41, No. 9, pp. 943-948 (September 2004) "Preparation of $UO_2$ Kernel for HTR-10 Fuel Element" describes the manufacture of $UO_2$ kernels using the gel precipitation process by external gelation.

In the known gel precipitation process, the following process steps are generally carried out:
Gel microspheres plus ammoniacal precipitation bath,
Transport of the microspheres in the precipitation bath,
Aging in the aging water,
Washing with ammonia water to the specified final value
Transport of the microspheres in the washing water to the dryer
Separation of the microspheres on the dryer, and
Further processing of the dried kernels.

However, the kinetics of the material exchange and the dynamics of the individual process steps for the preparation of uniform, rupture- and crack-free kernels are not taken into account sufficiently.

In the preparation of small kernels having an approximate final diameter of 200 μm, the kinetics of the material exchange does not play as great a role as in kernels having a final diameter of 500 μm and more, in which the final volume is more than 15 times greater. This is of decisive importance for maintaining the spherical shape, particularly in the field of preparation of gel microspheres by chemical reaction and the following shrinkage processes in the precipitation bath, during the aging, washing, and drying.

The multitude of kinetic reactions and concentration changes occurring in the precipitation bath can cause an unequivocal worsening of the product quality. The dropwise introduction of the ammonia-free pouring solution leads to a dilution with respect to ammonia and at the same time to an increase in the concentration of ammonium nitrate and auxiliary agents, such as, THFA and urea. In the continuous work mode, the use of an ammoniacal equilibrium precipitation bath is required, to ensure a consistent good product quality.

However, in the previous treatment, the gel microspheres are discharged with a large portion of the precipitation bath, and it is only thereafter that the precipitation bath is separated and returned.

By washing the aged microspheres with ammonia water, the water-soluble substances ammonium nitrate and auxiliary agents, such as, tetrahydrofurfuryl alcohol (THFA) and urea, are removed. Usually this process step is carried out stepwise in a criticality-safe rotating flat tank, where the microspheres are in movement together with the ammonia water. This process is repeated several times until the desired washing effect is reached.

An additional process step which is frequently not given sufficient attention is the dynamics during the transport of the microspheres with a view to the uniform treatment of all the particles. Even during the drying, microspheres can shrink differently, and acquire a shell-shaped structure, or burst.

The quality of the fuel kernels must satisfy a number of requirements, on the one hand, with a view to their further processing to coated particles and graphite fuel elements, and, on the other hand, with regard to good irradiation behavior in the reactor.

The following requirements are specifications for the prepared fuel kernels:
toughness and abrasion resistance,
a narrow diameter range with small standard deviation,
nearly ideal spherical shape, and
the same structure and porosity of all the individually produced kernels with high density and exact chemical composition.

In the manufacture of larger kernels having a final diameter between 300 μm and 800 μm, and larger, during the gel precipitation process, the organic auxiliary agent polyvinyl alcohol (PVA) in the form of an aqueous solution is used additionally, and, during the precipitation of the uranium, it forms an adduct with the ADU formed. The ADU decomposes thermally in air with the formation of $UO_3$. During this calcination process, the PVA also evaporates at temperatures above 300° C.

To purify a spherical nuclear particle, a countercurrent washer in the form of a cascade scrubber is used according to DE-A-27 57 602.

In a hot air furnace according to JP-A-06191851, spheres made of ammonium diuranate are arranged in shells and for the production of $UO_3$ kernels.

The present invention is based on the problem of further developing a method and an arrangement of the type mentioned in the introduction, in such as way as to take into account the special features of uranium chemistry for kernels having particularly a diameter in the range between 300 μm and 800 μm, and to achieve suitability for a continuous production method with unchanging high kernel quality.

The problem is solved according to the invention in terms of process substantially by the fact that the microspheres are separated out of the precipitation bath via a first separator, and led for aging to ammoniacal aging water, the microspheres are transferred via a transfer device from the aging water to a multistage cascade scrubber in which the microspheres are washed so they are at least free of ammonium nitrate, and, after the drying of the microspheres, during a thermal treatment, the microspheres, distributed in a monolayer, are calcined, where the contact duration of the microspheres with the precipitation bath liquid until the entry into the aging water is the same or approximately the same for each microsphere.

In particular, the first separator achieves that, for all the dripped (poured) particles, the same time span is kept between the formation in the precipitation bath and the collection in the ammoniacal aging water. According to the invention, the separator thus meets the conditions for all the gel microspheres to be formed under the same conditions, transported in the chemical equilibrium of the precipitation bath, and collected in the ammoniacal aging water.

Here, the separator comprises particularly a bottom consisting of a circular, flat perforated strainer made of stainless steel, over which a metal cylinder subdivided into sectors slowly turns, which is open at the top, and at the bottom sits tightly on the perforated strainer. The perforated strainer can here be manufactured according to a special etching process, where the strainer diameter, that is the mesh width, should be in the range between 300 µm and 500 µm. The gel microspheres are added by feeding with the help of a sluice system beneath the precipitation bath, that is, the pouring installation, together with precipitation bath fluid into one of the sectors of the separator, then moved on from position to position, so as to fall, in the last rotation position, before a new filling occurs, through an opening, such as, a pipe, in order to be led to the ammoniacal aging water.

Because of the perforated strainer in the separator, the precipitation-bath/transport liquid runs through its openings. This running through or dripping off occurs in each position before the transfer to the aging water. If six sectors are present, the liquid runs off in 5 sector positions. The precipitation bath liquid passing through the perforated strainer is then recycled into the precipitation bath circulation.

In particular, it is provided that ammoniacal aging water is set to equilibrium condition, at least with respect to the ammonium nitrate contained in the microspheres. This should also be the case with regard to auxiliary agents, such as, THFA or urea, present in the microspheres.

Equilibrium condition means that the individual microspheres, in each case with respect to individual components, present the same concentration ratios with respect to each other, where the concentrations of the individual components themselves can naturally differ from each other. In addition, during the fall through the aging section, the concentrations decrease. The relative concentration ratios of the components with respect to each other substantially persist. An exchange of components with the aging water occurs, in such a way that, to the required extent, the concentration of the components decreases in order to achieve a desired shrinkage of the microspheres in the aging water. Due to the equilibrium conditions, one ensures that the spheres present an equal or nearly equal diameter after leaving the aging water.

In the aging section, a uniform exchange of components with the aging water occurs, where, at the end of the aging section, the concentrations of at least THFA and $NH_4NO_3$ and $NH_4OH$ correspond to those in the aging water. If the content includes urea, this also applies to this component.

In particular, the ammoniacal aging water is set in such a way that an exchange of at most 15 wt %, particularly between 10 and 15 wt % of the THFA with $H_2O$ occurs. As a result, the shrinkage of the microspheres is favored.

If the microspheres are transferred from the separator to the aging water adjusted to room temperature, then the aging water is heated preferably to a temperature T1, preferably with 60° C.≤T1≤80° C., in order to age the microspheres subsequently over a time period t, preferably with 50 min≤t≤70 min at the temperature T1. Subsequently, that is after time period t, the aging water and thus also the microspheres are cooled to room temperature, and the microspheres are removed. The heating and cooling of the aging water can be carried out with at least one heat exchanger.

After the aging, the microspheres are led particularly via a second separator, which can have a design like the first separator, to the cascade scrubber which comprises several wash stages. In the process, washing water flows through the wash stages in such a way that the microspheres are largely maintained in a suspended state in each wash stage.

It is preferred to use a seven-stage cascade scrubber which comprises seven circulations having different washing water concentrations, that is, water with different proportions of ammonium nitrate, THFA, urea, and ammonium hydroxide.

Furthermore, there is a dosing pump for weakly ammoniacal ultrapure water, which flows from the bottom to the top through the cascade scrubber, and undergoes a concentration increase in the process.

Thus, on the one hand, the at first weakly ammoniacal ultrapure water flows through the cascade scrubber from the bottom to the top through the wash stages. On the other hand, a turnover occurs in each cascade stage, in which there is, in each case, a washing water composition that remains the same.

By means of the washing water that flows in the circulation, the sinking speed and thus the residence time of the microbe spheres in the individual cascade stages are adjusted.

The washing water is led to the individual wash stages of the cascade scrubber preferably through an annular gap, with adjustable separation, present at the bottom of a funnel of a wash stage. As a result, an exceedingly fine metering, that is, adjustment of the flow speed of the washing water can occur, in order to maintain, as mentioned, the microspheres to the necessary extent in a suspended state, that is, to predetermine the sinking speed.

After the washing of the microspheres, the latter can be dried in a continuous furnace, such as, a continuous belt furnace, and then calcined. The drying in air can be carried out at a temperature up to 120° C. The washed microspheres can be transported through the drying furnace on a strainer fabric. For this purpose, the microspheres can be supplied by means of a supply nozzle, substantially in a monolayer, where the supply nozzle should move in a controlled manner back and forth over the conveyor belt. Because a strainer fabric is used, the ultrapure water distributed together with the microspheres can flow off, to be collected beneath the strainer fabric, and optionally used again in the cascade scrubber.

To avoid conglutination of the microspheres, to be referred to as wet kernels, during the drying, a small quantity of water-soluble fatty alcohol, for example, 0.5 g Lutensol A8 per liter ultrapure water, or another detergent, can be added to the ammoniacal ultrapure water.

The dried kernels are then aspired by negative pressure, for example, using an aspiration nozzle, from the conveyor belt, to be calcined subsequently. For this purpose, the dried kernels can first be separated in a cyclone and collected in a reservoir.

Alternatively, both the drying and also the calcination can be carried out in a continuous furnace. Independently thereof, the calcination during the transport through one or more continuous furnaces should take place in such a way that the dried kernels are first introduced in metal shells in a monolayer, to ensure a very good heat transfer during the exothermic reaction, where ADU and PVA present as auxiliary substance are thermally degraded with formation of $UO_3$ kernels, while $NH_3$, $CO_2$ and water vapor are released as components of the discharged air.

The distribution of the dried kernels on the metal shells can take place by means of a dosing device using preferably a supply nozzle, by means of which the exact quantity of kernels for the formation of the monolayer is established, as well as by a slight shaking of the shell, so that the dried kernels occupy all the free places on the shell.

After the calcination, the kernels can be removed according to the invention with the help of an additional movable aspiration nozzle at a slight negative pressure from the shells, separated in a cyclone, and collected in a reservoir.

If the drying and calcination occur during the passage through a single furnace, then the washed microspheres should be delivered directly into corresponding metal shells.

Among other things, it is apparent from the above presentation that the method according to the invention can be characterized by the following steps, which are inventive taken each alone and/or in combination:

- The microspheres produced in the ammoniacal precipitation bath are separated by means of a first separator from the precipitation bath, they reach the ammoniacal aging water, in which the microspheres are heated to the aging temperature, and they remain in the aging water in accordance with the required aging time. Here, the first separator ensures that the contact duration of the microspheres with the precipitation bath liquid, between the formation of the microspheres and the entry into the aging water, is the same or approximately same for each microsphere.
- The microspheres are then separated by means of a second separator from the aging water, and reach the first wash stage of a multistage cascade scrubber, in which the microspheres are washed with ammonia water until they are nearly free of ammonium nitrate or auxiliary agents, such as, THFA and urea.
- The microspheres are then conveyed with the help of a dosing device together with the ammonia water of the last wash stage through a controlled, movable supply nozzle onto a conveyor belt made of strainer fabric of a continuous belt furnace, to be dried at a temperature of up to 120° C.
- The dried kernels are then either collected with the help of a removal device using a controlled, movable aspiration nozzle by aspiration from the strainer fabric, and separation by means of a cyclone, in a reservoir, and then delivered with the help of a dosing device using a supply nozzle on metal shells, in which the dried kernels are distributed by slight shaking in a monolayer, and then transported through the heater of a second continuous furnace, and calcined up to a final temperature of approximately 460° C., or
- The washed kernels are both dried and also calcined in a continuous belt furnace, where, for the drying and calcination, the washed microspheres are dispensed in a monolayer on metal shells.

An arrangement for producing spherical breeder material kernels and/or fuel kernels of the above-described type is characterized in that, between the precipitation bath and the aging section, a first transfer device in the form of a separator is arranged, which presents a cylinder, which is subdivided into sectors, and which can be rotated over a perforated strainer which presents a cutout, where, successively, each sector is aligned, in a first position covered on the bottom side by the perforated strainer, with the outlet opening of the precipitation bath, and, after turning the cylinder by an angle α, aligned, in a second position, with the cutout of the perforated strainer, which is in connection with the aging section. The angle α here is 360° divided by the number of sectors.

Beneath the perforated strainer, a liquid reception device is provided, which is connected directly or indirectly to the intake of the precipitation bath.

The perforated strainer of the separator should consist of stainless steel, and present a mesh width d with 300 µm≤d≤500 µm. The cylinder itself is made of metal, and should sit tightly on the perforated strainer.

In particular, it is provided that the cylinder is subdivided into n sectors, with n≥3, particularly n=6.

The aging section comprises a hollow cylinder space which is enclosed by a strainer fabric or perforated strainer, and receives the microspheres, and which is enclosed by a housing at a separation from the aging water transport. Moreover, the aging liquid can flow in a circulation which contains at least one heat exchanger, and in which the housing is integrated.

With the help of the heat exchanger, the aging water is heated or cooled to the desired temperature. Naturally, for heating or cooling, a separate heat exchanger can be used in each case.

Moreover, it is provided that the aging section is connected with a second transfer device, designed as a second separator, and connecting the aging section, in terms of transport, to the washing device. Here, it is provided that the design of the second separator corresponds to that of the first separator.

The washing device itself is designed as a cascade scrubber with m wash stages, where m≥2, particularly 2≤m≤8, preferably m=7.

Each wash stage should be designed, on the bottom side, as a funnel with an opening which can be closed by a cutoff device, such as, a nozzle head, to the desired extent. As a result, the quantity of the inflowing washing water or its speed can be controlled or regulated, and thus also the sinking speed of the microspheres falling from the top to the bottom through the cascade scrubber.

In a variant, it is provided that a washing water conducting line ends beneath the cutoff device. Furthermore, a setting element, such as, a bendable shaft, should extend within the line, where the shaft is connected to the cutoff device to set it.

Moreover, a liquid outlet opening is provided beneath the funnel, to allow the washing water to flow in each stage in the circulation.

The individual wash stages are arranged one above the other, where the liquid outlet opening starting from the housing of the first wash stage constitutes an outlet for a second wash stage which is connected beneath the first wash stage or the housing and connected with the latter in a liquid proof manner.

Moreover, on the bottom side, in the lowermost wash stage, an intake for weakly ammoniacal washing water is provided, where the washing water flows through all the wash stages, and is then discharged, at higher concentration, in the head area of the uppermost wash stage.

At least one continuous furnace should be arranged after the washing device, where the washed microspheres must be capable of being transported via a transport device through the continuous furnace. Here, the transport device can be an endless conveyor belt made of strainer fabric.

However, the possibility also exists to design the transport device so it consists of metal shells, each with a perforated floor, which are arranged in a row one after the other, and into which the washed microspheres are introduced. The mesh width of the perforated bottom should be in the range between 300 μm and 500 μm.

The washed microspheres are delivered via a feed device such as a supply nozzle on the transport device, such as, the conveyor belt or the metal shells, and aspired by means of negative pressure after the drying or calcination. This can also occur via an aspiration nozzle.

The dried and calcined kernels that have been aspired are separated preferably via a cyclone, and then collected in a reservoir.

If the drying and the calcination can occur in different continuous furnaces, then, in a variant of the invention, a continuous furnace is used, which presents several heating zones, where at least one heating zone is a drying zone, and an additional heating zone is a calcination zone.

In particular, it is provided that the continuous furnace can be operated in at least some areas in circulating air operation.

Additional details, advantages and characteristics result not only from the claims, the characteristics to be taken from them—separately and/or in combination—, but also from the following description of preferred embodiment examples to be obtained from the drawing.

Figure 3:
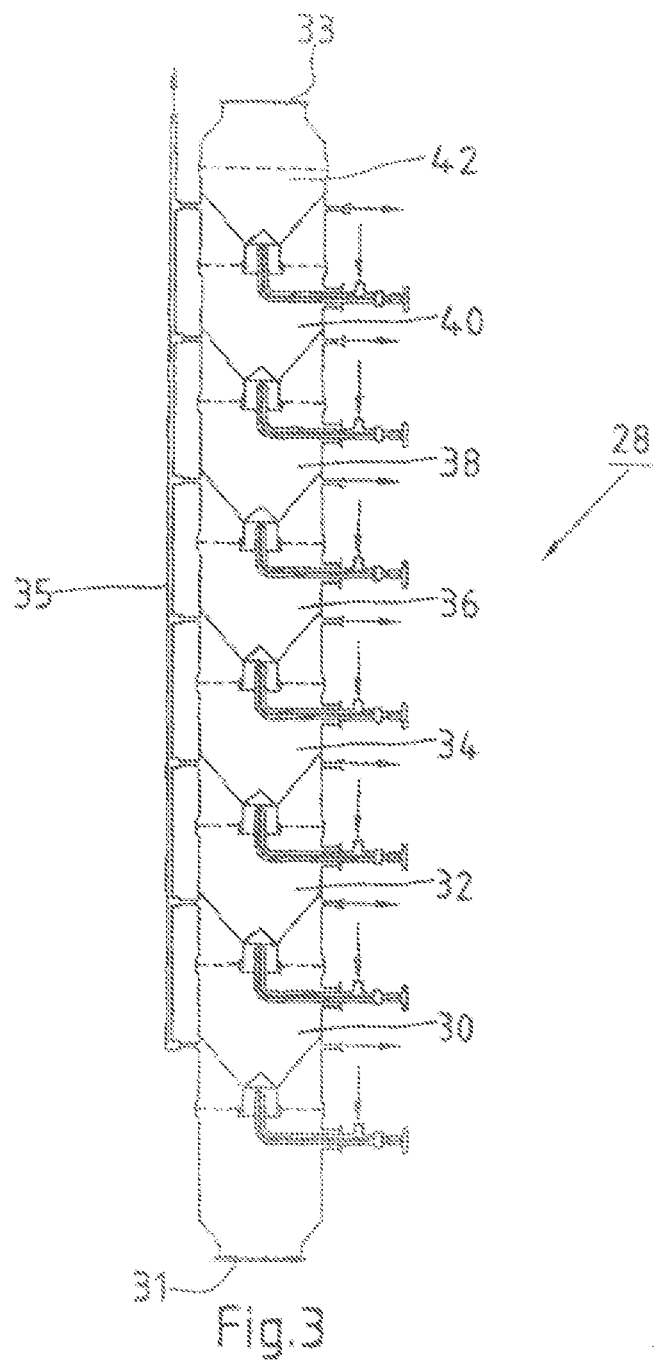
Figure 4:
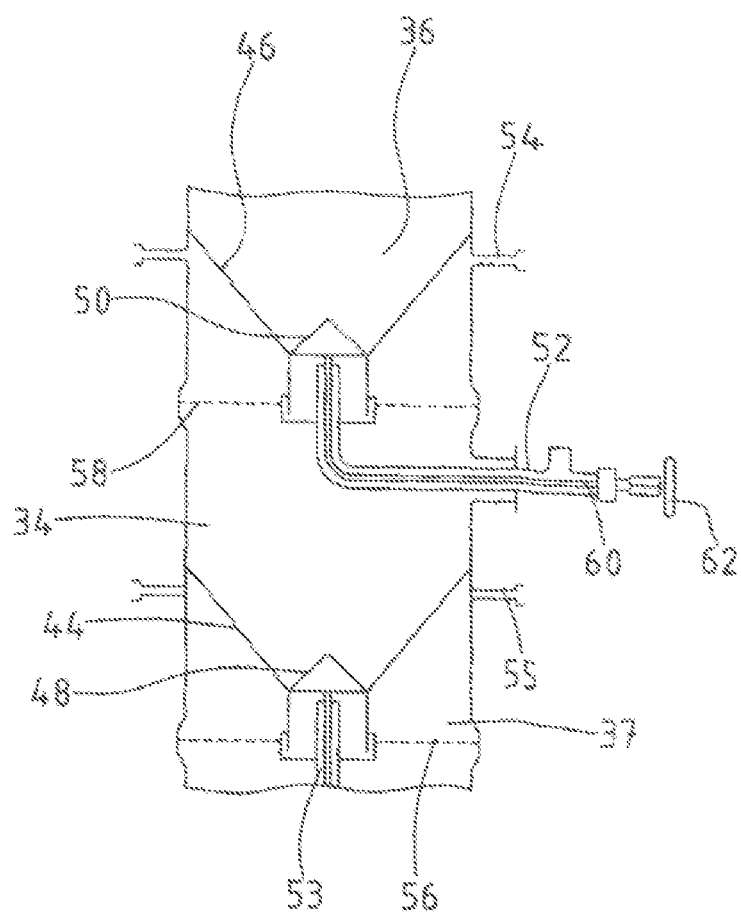
Figure 5:
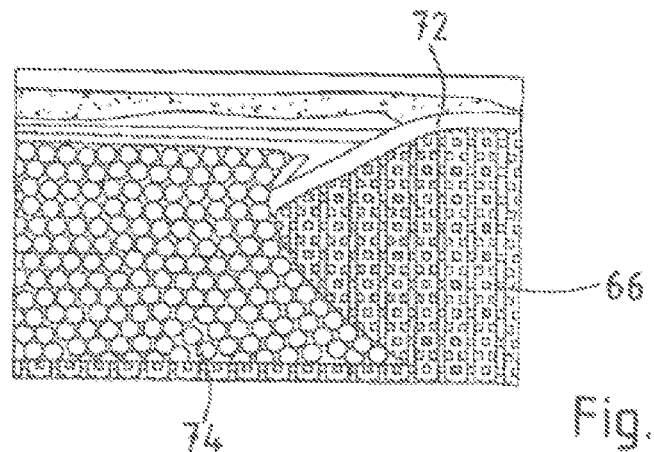
Figure 6:
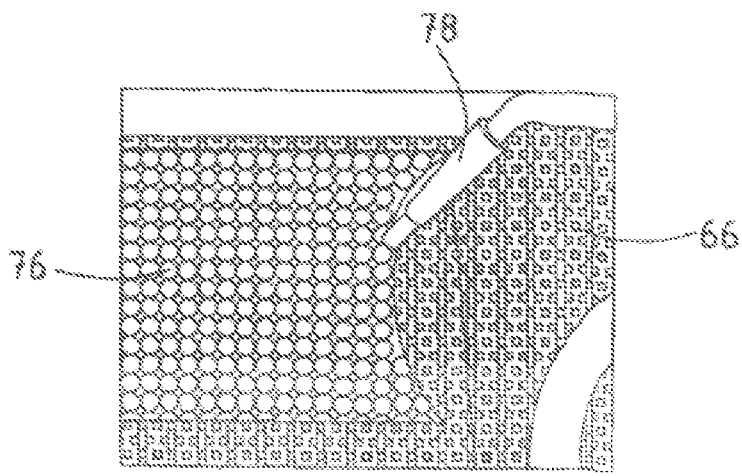
Figure 7:
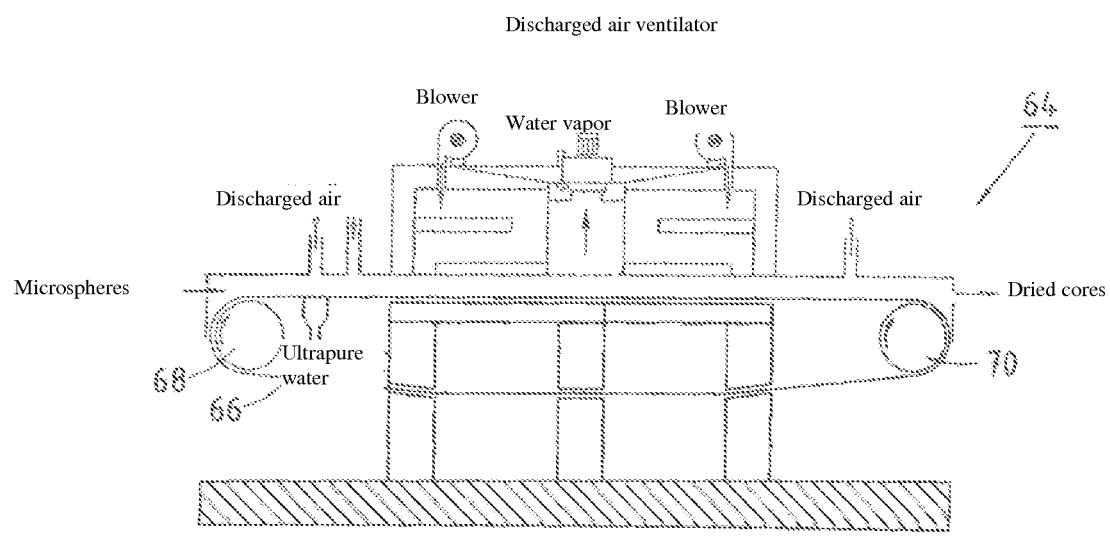
Figure 8:
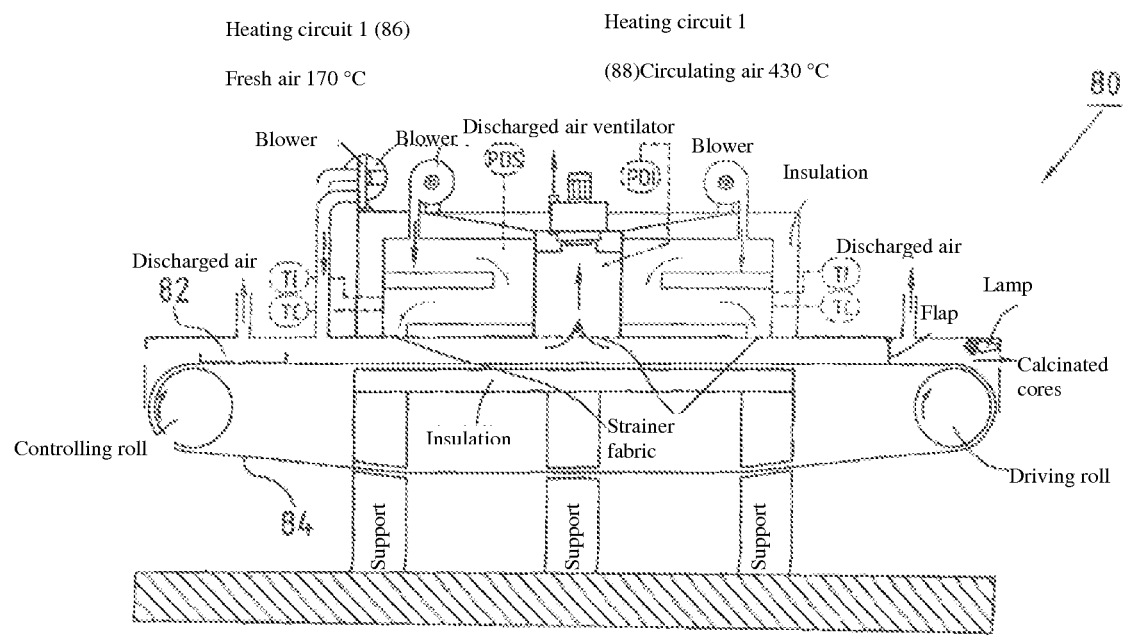
Figure 9:
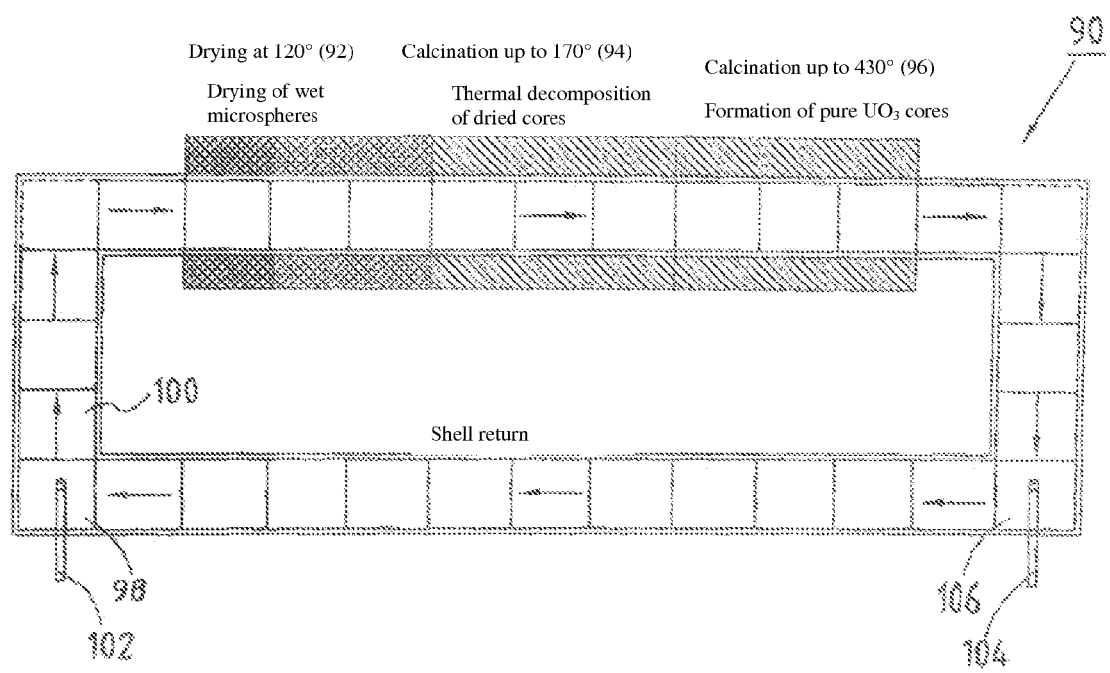

The figures show:

FIG. 1 a schematic diagram of a separator in cross section and top view,

FIG. 2 a schematic diagram of an aging section,

FIG. 3 a washing tower,

FIG. 4 a cut-out of the washing tower according to FIG. 3,

FIG. 5 a feed device for delivery on a strainer belt,

FIG. 6 an aspiration device for removal from a strainer belt,

FIG. 7 a first embodiment of a continuous belt furnace,

FIG. 8 a second embodiment of a continuous furnace,

FIG. 9 a schematic diagram of a third embodiment of a continuous furnace, and

FIG. 10 a flowchart for producing fuel kernels.

The figures show components of an installation or arrangement for producing spherical fuel kernels and/or breeder material kernels in the diameter range up to 800 μm, particularly for producing uranium kernels in oxide and/or carbide form with and without additions of thorium, plutonium or mixtures thereof, but particularly with the addition of auxiliary agents, such as, tetrahydrofurfuryl alcohol (THFA), urea as well as polyvinyl alcohol (PVA). The manufacturing process includes the dripping (pouring) of aqueous nitric acid solutions, preliminary hardening of the drops in an ammonia gas atmosphere, and hardening in an aqueous ammonia solution as well as subsequent aging, washing, drying, and thermal treatment.

In the case of a corresponding gel precipitation process referred to as external gelation, insoluble ammonium diuranate (ADU) is produced, as well as water-soluble ammonium nitrate, as byproduct. Additional additives for the pouring solution, such as, THFA and optionally urea, must also be washed out of the ADU gel microspheres by washing with ammonia water. In the case of the larger kernels to be produced according to the invention, having final diameters between 300 μm and 800 μm, during the gel precipitation process, the organic auxiliary agent polyvinyl alcohol (PVA) in the form of an aqueous solution is used additionally, which agent, during the precipitation of the uranium forms an adduct with the ADU formed. The ADU undergoes thermal degradation during the calcination process in air, with formation of $UO_3$. During the calcination process, the PVA also evaporates at temperatures above 300° C.

According to the invention, the time span between the formation of the dripped or poured particles in the precipitation bath, that is the microspheres, and the collection in the ammoniacal aging water, is equal or substantially equal. This is achieved according to the invention by the fact that the microspheres after the precipitation bath are led to a separator or an element having an equivalent action, which serves as a transfer device for transfer to the aging section. An element having an equivalent action is, for example, a strainer belt. Therefore, the term separator must also be understood and interpreted as synonymous with corresponding elements that have an equivalent action.

A corresponding separator 10, which, as mentioned, is arranged after the precipitation bath, can be seen in FIG. 1.

The separator 10 consists of a circular, flat, perforated strainer 12 made of stainless steel, which on the bottom side covers a metal cylinder 14 divided into sectors. The metal cylinder 14 is open on the side of the precipitation bath. The metal cylinder 14 is preferably subdivided into six sectors 1-6 of equal surface area, that is it presents blades or separating plates 15 starting from a rotation axis, which turn slowly over the perforated strainer 12. Here, the sectors 1-6, that is the separating plates 15, sit tightly on the perforated strainer 12 between the sectors 1-6.

The perforated strainer 12 can be manufactured using a special etching process, where the mesh width, that is, its diameter should be in the range between 300 μm and 800 μm.

The gel microspheres formed in the precipitation bath are fed with the help of a sluice system beneath the pouring installation together with precipitation bath liquid into a sector (filling position 1) of the separator 10, and then moved on from position to position (drip positions 2-5), to be subsequently led into the sixth position (transfer position)—in the case of six sectors—through a cutout, that is, an opening 17 in the strainer plate 12, through, for example, a pipe 16, to an aging section 18.

The aging section 18 presents a vertically oriented housing 20, in which, at a separation from the inner wall of the latter, and in the longitudinal axis direction of the latter, a cylindrical strainer fabric 22 or a perforated strainer made of stainless steel extends, by means of which a cylindrical inner space is formed, in which the microspheres delivered by the separator 10 can age. The separation between the strainer fabric or the perforated strainer 22 and the housing 20 is necessary so aging water can flow through, where the aging water is led via the connectors 24, 26 in a circulation, in which at least one heat exchanger is arranged. By means of the heat exchanger, the aging liquid is adjusted to a desired temperature.

Thus, for the transfer of the microspheres from the separator 10, the aging water should be at room temperature. If microspheres have collected to the required extent in the inner space of the housing 20, then the aging water is heated, for example, to a temperature of 60-80° C., that is to the required aging temperature. After the required aging time, for example, 1 h, the aging water is cooled by means of the, or by an additional, heat exchanger to room temperature, where the microspheres present in the aging section 18 also cool at the same time.

According to the invention, it is provided that for the uniform treatment of the gel microspheres in the ammoniacal aging water, equilibrium conditions with respect to the ammonium nitrate and/or ammonium hydroxide as well as the additives, such as, THFA and urea, must be maintained, to achieve a uniform shrinkage of the microspheres during the thermal treatment. With regard to THFA, it is preferred to carry out an exchange of at most 15 wt % THFA, particularly between 10 wt % and 15 wt %, with $H_2O$. As a result, the shrinkage is favored.

In the present case, equilibrium conditions means that the microspheres, after leaving the aging water, present substantially the same concentration with respect to ammonium nitrate, or THFA, or urea, or ammonium hydroxide, respectively, where the concentration of the components can differ from each other. The aging water is accordingly adjusted in such a way that the microspheres, during the stay in the aging water, undergo the same material exchange, so that the microspheres present an equal concentration with respect to the respective component, after leaving the aging water process. This ensures that each sphere shrinks to the same extent, and presents the desired diameter and sphere geometry after leaving the aging water.

A typical embodiment example is provided to illustrate the material exchange between the produced microspheres at the instant of their formation due to the action of a harmonic oscillation on the liquid jet of the pouring solution and the subsequent processes: collection in the precipitation bath, shrinkage in the aging water, washing with ultrapure water, drying and calcination.

A uranyl nitrate solution is adjusted with ammonia solution to pH 2, and then an aqueous solution of polyvinyl alcohol (PVA) is admixed. This solution is divided: In case A, this solution is adjusted with ultrapure water to a uranium concentration of 120 g U/L and 25 g PVA/L (pouring solution A). In case B, the second part of the solution is mixed with tetrahydrofurfuryl alcohol (THFA) and a small amount of ultrapure water, where, as pouring solution B, the following concentrations are used: 120 g U/L, 25 g PVA/L, and 300 g THFA/L. Pouring solution B thus contains additionally the water-soluble substance THFA.

The two pouring solutions A and B are transformed under the same conditions into microspheres. From each solution, using nozzles, liquid jets are produced which form drops, under the action of a harmonic oscillation at a frequency of 100 Hz. At a volumetric flow rate of 1.9 L/h, drops having a diameter of 2150 μm form. These drops are superficially solidified in an ammonia gas fall section, and hardened in the ammoniacal precipitation bath. The hardened microspheres have a gel structure; they consist of ammonium diuranate plus polyvinyl alcohol as adduct (ADU+PVA) and contain additional dissolved substances, such as, ammonium nitrate and ammonium hydroxide (with type A) as well as additionally THFA (with type B).

Microspheres of type A and B were measured by microscopy with respect to diameter size, after each process step.

The results show the following: Microspheres of type A (without THFA) present a broad diameter distribution both after the aging and after the washing, that is, they shrink very differently, although the composition of the main components ADU+PVA is the same. The microspheres of type B (with THFA) have a very narrow size range and they shrink uniformly, particularly after aging and washing, preferably due to the material exchange between THFA and aging water or ultrapure water. Even after the drying and calcination, the diameter range of the microspheres is within narrow boundaries.

The results show that, in the aging bath, a uniform shrinkage of the microspheres occurs due to the material exchange between THFA and ammonia water occurs. This material exchange also applies to the other components, such as, $NH_4NO_3$, $NH_4OH$, and, if applicable, urea.

After the aging, all the microspheres have a very narrow diameter distribution. The uniform shrinkage of the microspheres continues even during the washing, and it leads to microspheres having a narrow diameter distribution after the washing.

If no exchange occurs, then, besides a certain loss of ammonia due to heating, no additional material exchange occurs in the ammoniacal aging water.

After the aging has been carried out, the microspheres are conveyed from the aging section 18 to an additional transfer device, to be subjected to a washing process. Here, the design of the transfer device can correspond to the separator 10. Thus, the cooled aging water will run off and be collected beneath the perforated strainer. Then, a concentration with ammonia gas is carried out, which the gel microspheres possess after the separation from the ammoniacal precipitation bath, and a return to the aging section 18 is carried out.

The aged microspheres consist of insoluble ammonium diuranate (ADU) and polyvinyl alcohol (PVA)—adduct with the water-soluble substances ammonium nitrate, THFA and urea, to the extent that these additives are present in the starting solution. For the removal of these water-soluble substances, a multistage cascade scrubber is used according to the invention, which ensures the continuous industrial operation for a multistep washing process.

A corresponding washing tower 28 can be seen in FIG. 3. The washing tower 28 consists, in the embodiment example, of 7 cascades 30, 32, 34, 36, 38, 40, 42. Each cascade 30, 32, 34, 36, 38, 40, 42 is integrated in one of the washing circulations, in which the microspheres are washed progressively, that is, from stage to stage, until in the end they are nearly free of ammonium nitrate, THFA, and urea. As washing liquid, a weakly ammoniacal, approximately two molar, ultrapure water is used, which is introduced through an opening 31 in the bottom of the washing tower 28 and which flows through the cascades 30, 32, 34, 36, 38, 40, 42, to be discharged in an opening 33 located in the head area. In the process, the composition of the washing liquid changes from stage to stage due to the material exchange between the washing liquid and the spheres.

Moreover, as can be seen in FIG. 3, the individual stages, including the areas of the washing tower 28, through which the washing fluid is supplied, are connected with a ventilation line 35.

The aged microspheres fall out of the second separator, that is, out of its pipe, which corresponds to the pipe 16 according to FIG. 1, into the uppermost or the first wash stage, that is cascade 42 of the cascade scrubber, and are washed there; subsequently they run through all additional wash stages, and, in the last wash stage, they are washed with weakly ammoniacal, approximately two molar, ultrapure water which was supplied through the opening 31, until the ammonium nitrate content is sufficiently low.

Ammonia water is needed to prevent a hydrolysis of precipitated products.

In FIG. 4, purely as an example, three successive cascade or wash stages 34, 36, 37 are represented. Each cascade 34, 36, 37 presents, on the bottom side, a funnel 44, 46, allowing the microspheres to fall from stage to stage. On the bottom side, the respective funnel 44, 46 is closable to the desired extent by means of an annular gap nozzle with nozzle head 48, 50. Furthermore, each cascade presents a line 52, 53, through which the washing water can be supplied, which is led in circulation in the respective stage. In the head area of each cascade 34, 36, 37, a liquid outlet opening 54, 55 is also present. Here, the outlet opening 54 of the middle cascade 36, in FIG. 4, is connected with the subsequent, that is the lower, cascade 37, to be able to rinse in this way the interior space in the circulation. Each funnel 46 delimits two washing spaces. The reason for this is that the interface between the individual cascades 34, 36, 37 runs between the funnels 44, 46. The corresponding interfaces are marked with the reference numerals 56, 58. Furthermore, a pump—not shown—with measurement and regulation device is present, assigned to each washing space, and connected to the connectors 52, 54. The circulation for the cascade 34 or the washing space delimited by the latter thus includes the line 53 as well as the outlet 54, which are connected via a line which presents a pump and extends outside of the washing tower 28.

The microspheres present in the wash stage are kept in a suspended state to the required extent, by the washing water which is continuously turned over by pumping with the help of the activated circulation pump. The flow rate of the washing water in the annular gap of the funnel 44, 46 is adjusted with the help of the nozzle head 48, 50, which in each case can be adjusted via a bendable shaft 60, for example, with a hand wheel 62, from the outside, in terms of height. The annular gap nozzle is designed in such a way that the washing water flows all around upwards against the wall of the funnel 44, 46. After raising the nozzle head 48, 50, the ring gap is enlarged and the flow rate in the gap is reduced, and vice versa.

Due to the adjustment of the annular gap nozzle, the sinking speed of the microspheres is consequently predetermined, and thus the passage of the individual cascades through the funnel 44, 46.

As can be seen in FIG. 4, the bendable shaft 60 extends within the washing water supply line 52.

In the embodiment example, the seven-stage cascade scrubber 28 consists consequently of seven circulations with different washing water concentrations with seven circulation pumps as well as one dosing pump for the weakly ammoniacal, approximately two molar, ultrapure water which is supplied through the opening 31.

According to the invention, the cascade scrubber 28 can be composed of glass parts, while the nozzle heads 48, 50 with the respective bendable shaft 60 should be manufactured from stainless steel. The cascade scrubber 28 can naturally also be made entirely of stainless steel. This would simplify the setting of the annular gap, or make it more precise.

After washing the microspheres, they are subjected to at least two thermal treatments, of which one results in a drying of the microspheres, and the other in a calcination. Here it is preferred to provide a continuous belt furnace, which may present a different design.

Thus, the drying of the washed microspheres is carried out according to the embodiment example of FIG. 7 in a continuous belt furnace 64. This can be carried out with air at a temperature of up to 120° C. For this purpose, the microspheres are conveyed on an endless conveyor belt 66 made of strainer fabric, through the furnace 64 to the furnace outlet. The deflection of the conveyor belt 66 occurs via rolls 68, 70, and the precise orientation by means of a light optically controlled roll.

In the representation in the drawing, the washed microspheres of the last wash stage of the cascade scrubber 28 are conveyed together with the ammoniacal ultrapure water with the help of a dosing device, for example, a supply nozzle 72 (FIG. 5), which moves in a controlled manner back and forth over the running conveyor belt 66, and distributes the microspheres 74 together with the transport liquid uniformly on the belt 66. The ultrapure water flows off through the strainer fabric, and is collected. The wet microspheres 74 are conveyed on the conveyor belt 66 through the furnace 64, and dried in it. At the furnace outlet, the dried kernels 76 can be aspired with a controlled movable aspiration nozzle 78 at slight negative pressure from the strainer fabric, that is from the conveyor belt 66, separated in a cyclone 83 (FIG. 10), and collected in a reservoir.

To prevent the conglutination of the wet microspheres 74 during drying, a small quantity of water-soluble fatty alcohol, for example, 0.5 g Lutensol A8 per liter ultrapure water, or another detergent can be added to the ammoniacal ultrapure water.

The dried kernels are then calcined in an additional continuous belt furnace 80 (FIG. 8) in air up to 430° C., where ADU and PVA are thermally decomposed with formation of $UO_3$ kernels, while $NH_3$, $CO_2$ and water vapor are released as components of the discharged air.

According to the invention, the calcination occurs on metal shells 82, which can be conveyed via a conveyor belt 84 through the furnace 80. The conveyor belt 84 can also present a strainer fabric. According to the invention, the calcination occurs on the metal shells 62 in a monolayer, that is, the kernels lie only next to each other and not one above the other, in order to ensure a very good heat transfer during the occurring exothermic reactions. The distribution of the dried kernels on the metal shells 82 occurs with a dosing device, particularly using a supply nozzle, by means of which the exact quantity of kernels for the formation of the monolayer is established, as well as by slight shaking of the shell 82, which results in the microspheres occupying all the free spaces on the shell 82. The metal shells 82 have a perforated bottom.

Here, the mesh width is such that it is generally smaller than the microspheres in the respective manufacturing step.

After the calcination, the kernels are removed according to the invention with the help of a movable aspiration nozzle at a slight negative pressure from the shells 82, separated in a cyclone 83 (FIG. 10), and collected in a reservoir. In this regard, reference is made to the explanations pertaining to FIGS. 5 and 6.

The metal shells 82 are preferably mounted on the conveyor belt 84, and they are preferably made of heat resistant steel, such as, Thermax or Inconel.

As shown in FIG. 8, the continuous belt furnace presents two heating circuits 86, 88. The first heating circuit 86 is operated with fresh air at approximately 170° C., and the second heating circuit in circulating air operation at approximately 430° C.

For example, it is indicated that the channel in which the dried kernels are exposed to the heating circuits can present a length of 3.25 m, a width of 0.32 m, and a height of 80 mm. The metal shells 82 can present dimensions of $300 \times 350$ mm$^2$ with a height of 10 mm.

As shown purely diagrammatically in FIG. 9, the drying and calcination process can also be carried out in a continuous belt furnace 90 with air in the temperature areas 120° C., 170° C. and 430° C., where, in the first stage 92 (up to 120° C.), the wet microspheres are dried, in the second stage 94 (calcination up to 170° C.), the thermal decomposition of the dried kernels present in a monolayer occurs, and in the third stage 96 (calcination up to 430° C.), the formation of pure $UO_3$ kernels is achieved.

In the embodiment example of FIG. 9, the conveyor belt of the furnace 90 is made from perforated metal shells 98, 100, 106 with a strainer diameter of 300-500 μm, for example, which are pulled by a drive system through the furnace 90, and returned as endless belt. According to the invention, a certain quantity of washed microspheres is distributed with the ultrapure water of the last wash stage of the cascade scrubber 28, with the help of a supply nozzle 102, uniformly on the first perforated metal shell 98. The transport liquid flows off through the openings of the metal shells 98. In the embodiment example, the arrangement of the metal shells 98, 100, which are led in a closed circuit, is chosen in such a way that flowing off via five shell positions becomes possible. The wet kernels reach the perforated metal shells in the dry space of the continuous belt furnace 90, and there they are dried in the first stage 92 at temperatures up to 120° C. By slightly shaking the shell 98, 100, the dried kernels form a monolayer having at most the quantity of microspheres that was delivered with the washing water. Because the dried kernels have a diameter of, for example, approximately 1 mm, the holes of the bottom of the metal shell will become filled, and the rest will therefore become distributed uniformly.

The dried kernels are then calcined in the second and third stage 94 and 96, respectively, at temperatures up to approximately 170° C. and approximately 430° C., respectively, in the same perforated metal shell up to a diameter of approximately 0.8 mm. Subsequently, the shells are conveyed out of the furnace 90 and deflected.

The calcined kernels are removed with the help of a movable aspiration nozzle 104 at a slight negative pressure from the perforated metal shells 106, separated in a cyclone, and collected in a reservoir.

The emptied and perforated metal shells 106 move back, outside of the furnace, into the delivery position (position of the shell 98) for washed microspheres plus transport liquid, and are reloaded there.

The bottom of each metal shell 98, 100, 106 consists of a flat perforated strainer, which can be manufactured by a special etching process. The shell edge presents a height of approximately 10 mm. As metal for the shells, stainless steel, Thermax or Inconel, is used.

The supply nozzle 102 for the wet microspheres plus transport liquid is controlled in such a manner that the metal shell is filled uniformly, and the quantity of microspheres is not smaller than required for the formation of the monolayer of dried kernels.

The switching of the microsphere flow to the next shell occurs synchronously with the change of the shells at an appropriate time interval.

FIG. 10 again shows the production method according to the invention in the flowchart. By means of a vibrator 101, uranyl nitrate solution, for example, is dripped, in a known way; the drops are subjected to a preliminary hardening in an ammonia gas atmosphere, and then gelled in a precipitation bath 102 consisting of an aqueous ammonia solution. The microspheres are supplied batchwise through a sluice 104 to the separator 10, to be then subjected to aging (aging section 18), a washing process (cascade scrubber 28) as well as drying and calcination (continuous furnaces 64, 80), as explained above. Here, an essential characteristic is that the time period within which the microspheres are in contact with the precipitation bath liquid, up to the contact with the aging liquid, is the same or approximately the same for each microsphere, so that the concentrations of the components of the microspheres are the same or substantially the same. The spheres also present substantially no differences with respect to their diameters and concentrations of the components after the aging section 18, so that, in the final effect, fuel or breeder material kernels are obtained with diameters that present only little dispersion.

In the process, in the aging step, equilibrium conditions are set in such a manner that the concentration of the components in the individual microspheres with respect to ammonium nitrate or the auxiliary agents is the same or substantially the same, where the concentrations of the components themselves can naturally differ from each other.

By means of the cascade scrubber 28, one ensures that the microspheres transferred via a separator corresponding to the separator 10, from the aging section to the cascade scrubber 28, are nearly free of ammonium nitrate and auxiliary agents, such as, THFA and urea. The calcination of the dried microspheres which occurs in a monolayer also ensures that a uniform shrinkage to the required extent occurs.

The invention claimed is:

1. A method for producing spherical fuel and/or breeder material cores having a size in the range between 300 μm and 800 μm, for producing cores made of uranium oxide and/or uranium carbide and/or a uranium containing mixed oxide and/or mixed carbide by dripping a solution containing a uranyl nitrate, as well as auxiliary agents in the form of tetrahydrofurfuryl alcohol and polyvinyl alcohol in an ammoniacal precipitation bath for the formation of microspheres; aging the microspheres in an ammoniacal aging water; washing the microspheres; and drying as well as a thermal treatment of the microspheres, characterized in that the microspheres are separated from the ammoniacal precipitation bath via a first separator, and for aging, led to the ammoniacal aging water, wherein the time period within which the microspheres are in contact with the ammoniacal precipitation bath up to the contact with the ammoniacal aging water, is the same, or approximately the same for each microsphere by means of the first separator; the microspheres are transferred via a transfer device from the ammoniacal aging water to a multistage cascade scrubber, in which the microspheres are washed until they are free, or substantially free, of ammonium nitrate, and at least one of the auxiliary agent contained in the microspheres; and after the drying of the microspheres, the latter are calcined and distributed in a monolayer during a thermal treatment.

2. The method according to claim 1, characterized in that the ammoniacal aging water is set to equilibrium conditions in such a way that every, or substantially every, microsphere with respect to components, in each case, presents a same or substantially a same concentration.

3. The method according to claim 2, characterized in that equilibrium conditions are set, in the ammoniacal aging water, at least with respect to ammonium nitrate and/or urea contained in the microspheres.

4. The method according to claim 2, characterized in that equilibrium conditions are set, in the ammoniacal aging water, at least with respect to the tetrahydrofurfuryl alcohol contained in the microspheres.

5. The method according to claim 2, characterized in that, after removal of the microspheres from the ammoniacal aging water, the concentration of at least tetrahydrofurfuryl alcohol in the microspheres is equal to, or approximately equal to, the one in the ammoniacal aging water.

6. The method according to claim 2, characterized in that, after removal of the microspheres from the ammoniacal aging water, a concentration of ammonium nitrate, ammonium hydroxide, and if the content includes urea, of urea in the microspheres is equal to, or approximately equal to, the one in the ammoniacal aging water.

7. The method according to claim 1, characterized in that in the ammoniacal aging water, conditions are set which allow an exchange of at most 15 wt %, with $H_2O$.

8. The method according to claim 1, characterized in that the microspheres are transferred into the ammoniacal aging water which has been set to room temperature, subsequently heating to a temperature T1 with $60°C. \leq T1 \leq 80°C.$ is carried out, the microspheres remain for a time t with $50 \leq min \leq t \leq 70$ min at the temperature T1 in the ammoniacal aging water, and after the time t, the ammoniacal aging water is cooled to room temperature, and the microspheres are then removed.

9. The method according to claim 8, characterized in that the heating and cooling of the ammoniacal aging water is carried out by means of at least one heat exchanger.

10. The method according to claim 1, characterized in that the microspheres are led in the multistage cascade scrubber through several wash stages.

11. The method according to claim 10, characterized in that a sinking speed of the microspheres in each wash stage is set by washing water which flows in a circulation in each wash stage.

12. The method according to claim 10, characterized in that washing water of the wash stage is supplied via an annular gap, with adjustable separation, which is present in the bottom of a funnel.

13. The method according to claim 11, characterized in that, besides the washing water which is led in circulation in each wash stage, washing water is led through all the cascades starting from a bottommost cascade.

14. The method according to claim 13, characterized in that, as washing water supplied to the bottommost cascade, weakly ammoniacal water is used.

15. The method according to claim 13, characterized in that, as washing water supplied to the bottommost cascade, two molar ammoniacal water is used.

16. The method according to claim 1, characterized in that the washed microspheres are dried in a continuous belt furnace at a temperature T2 with $T2 \leq 120°$ C.

17. The method according to claim 16, characterized in that the washed microspheres are evenly distributed with washing water via a feed device, on a conveyor element conveyed through the continuous belt furnace.

18. The method according to claim 17, characterized in that the microspheres are applied to a strainer belt or the conveyor element.

19. The method according to claim 17, characterized in that a detergent is added to the washing water before the supplying on the conveyor element.

20. The method according to claim 19, characterized in that a water-soluble fatty alcohol is used as detergent.

21. The method according to claim 16, characterized in that the dried microspheres, after passing through the continuous belt furnace, are conveyed by a conveyor from which the microspheres are removed by means of an aspiration device, and are then separated in a cyclone, and collected in a reservoir.

22. The method according to claim 1, characterized in that the microspheres in the monolayer are conveyed in metal shells which present openings on a bottom side and are conveyed through a continuous furnace, and calcined at a temperature T3 with $T3 \leq 450°$ C.

23. The method according to claim 16, characterized in that the microspheres in the continuous belt furnace, pass through several heating zones with at least one drying zone and at least one calcination zone.

24. The method according to claim 1, characterized in that the drying and/or calcination are carried out in a circulating air operation.

25. The method according to claim 22, characterized in that the calcined microspheres are aspired from the metal shell.

26. The method according to claim 25, characterized in that the aspired microspheres are separated in a cyclone and collected in a reservoir.

27. The method according to claim 16, characterized in that the temperature T2 is $100°$ C.$\leq T2 \leq 120°$ C.

28. The method according to claim 22, characterized in that the temperature T3 is $160°$ C.$\leq T3 \leq 430°$ C.

29. The method according to claim 22, characterized in that the microspheres are calcined in two steps.

30. The method according to claim 7, characterized in that in the ammoniacal aging water, conditions are set which allow an exchange of 10-15 wt % THFA, with $H_2O$.

* * * * *

UNITED STATES PATENT AND TRADEMARK OFFICE
CERTIFICATE OF CORRECTION

PATENT NO. : 9,047,993 B2
APPLICATION NO. : 13/130199
DATED : June 2, 2015
INVENTOR(S) : Werner Heit et al.

It is certified that error appears in the above-identified patent and that said Letters Patent is hereby corrected as shown below:

Title Page (73) Assignee should read: NUKEM TECHNOLOGIES GMBH, Alzenau (DE)

Signed and Sealed this
Tenth Day of November, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,047,993 B2 | Page 1 of 1 |
| APPLICATION NO. | : 13/130199 | |
| DATED | : June 2, 2015 | |
| INVENTOR(S) | : Werner Heit et al. | |

It is certified that error appears in the above-identified patent and that said Letters Patent is hereby corrected as shown below:

TITLE PAGE: Item 73

This certificate supersedes the Certificate of Correction issued November 10, 2015.

Item [73], Assignee, "NUKEM TECHNOLOGIES GMBH, Alzenau (DE)" (as corrected to read in the Certificate of Correction issued November 10, 2015) is deleted and patent is returned to its original state with the assignee name in patent to read --NUKEN TECHNOLOGIES GMBH, Alzenau (DE)--

Signed and Sealed this
Twenty-second Day of December, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,047,993 B2 | Page 1 of 1 |
| APPLICATION NO. | : 13/130199 | |
| DATED | : June 2, 2015 | |
| INVENTOR(S) | : Werner Heit et al. | |

It is certified that error appears in the above-identified patent and that said Letters Patent is hereby corrected as shown below:

Title Page, Item (73) should read

(73) Assignee: NUKEM TECHNOLOGIES GMBH, Alzenau (DE)

Signed and Sealed this
Thirty-first Day of May, 2016

Michelle K. Lee
*Director of the United States Patent and Trademark Office*